United States Patent
Mastro et al.

(10) Patent No.: US 6,848,978 B2
(45) Date of Patent: Feb. 1, 2005

(54) METHOD OF FINISHING A BELT SEAM USING AN ABRASIVE FINISHING MACHINE, A METHOD OF FINISHING A BELT SEAM USING AN ABRASIVE FINISHING MACHINE HAVING A PLURALITY OF FINISHING HEADS, AND A METHOD OF FINISHING A BELT SEAM USING AN ABRASIVE FINISHING MACHINE HAVING FIRST, SECOND, THIRD AND FOURTH FINISHING HEADS

(75) Inventors: Paul F. Mastro, Little Rock, AR (US); Daniel L. Coughlin, Jr., Elba, NY (US); Thomas L. DiGravio, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 30 days.

(21) Appl. No.: 10/427,327

(22) Filed: May 1, 2003

(65) Prior Publication Data

US 2004/0014402 A1 Jan. 22, 2004

Related U.S. Application Data

(63) Continuation-in-part of application No. 09/723,150, filed on Nov. 27, 2000, now abandoned.

(51) Int. Cl.$^7$ ................................................ B24B 1/00
(52) U.S. Cl. ............................ 451/51; 451/56; 451/59; 451/296
(58) Field of Search ............................ 451/51, 54, 56, 451/59, 296, 300

(56) References Cited

U.S. PATENT DOCUMENTS

| | | | |
|---|---|---|---|
| 4,796,387 A | | 1/1989 | Johnson ........................ 51/62 |
| 4,941,294 A | * | 7/1990 | Nakagaki ..................... 451/179 |
| 5,418,349 A | | 5/1995 | Swain et al. ............ 219/121.84 |
| 5,549,193 A | | 8/1996 | Schlueter, Jr. ............ 198/844.2 |
| 5,549,999 A | | 8/1996 | Swain et al. ................. 430/127 |
| 5,552,005 A | * | 9/1996 | Mammino et al. ........... 156/157 |
| 5,612,773 A | | 3/1997 | Berkes et al. ................ 399/307 |
| 5,951,377 A | * | 9/1999 | Vaughn et al. ................. 451/49 |
| 5,997,974 A | | 12/1999 | Schlueter, Jr. et al. ......... 428/58 |
| 6,001,006 A | * | 12/1999 | Pineau et al. ................ 451/297 |
| 6,068,722 A | | 5/2000 | Yu et al. ...................... 156/137 |
| 6,220,940 B1 | | 4/2001 | Johnson ........................ 451/59 |

OTHER PUBLICATIONS

Hammond Machinery Technical Bulletin No. FFP–1000A, Article entitled: "Abrasive Belt Finishing of Skate Blades".
Hammond Machinery Technical Bulletin No. KP–570A, Article entitled: "Chamfering Both Sides of Compressor Axial Plates".
Abrasive Engineering & Mfg. (AEM) Flyer, Entitled 700 Series Sanders, Abrasaplaners & Knife Planer/Sanders.

* cited by examiner

*Primary Examiner*—M. Rachuba
(74) *Attorney, Agent, or Firm*—Wayne J. Egan

(57) ABSTRACT

An imageable belt includes a seam that is finished using an abrasive finishing machine. The seam comprises a seam width with adhesive material disposed thereon. The finishing process includes an abrasive finishing media with a finishing surface and a backer bar. The backer bar comprises a backer bar radius. The backer bar surface is positioned against the belt inner surface so that the belt outer surface contacts the finishing surface to define a finishing contact arc with respect to the backer bar radius. A tension, feed rate and pressure are applied to the finishing media. Using the finishing machine, the seam is then finished to remove the adhesive material. The finishing process results in a seam that is imageable. In one embodiment, the backer bar radius is adjusted so that the finishing contact arc covers the seam width.

25 Claims, 9 Drawing Sheets

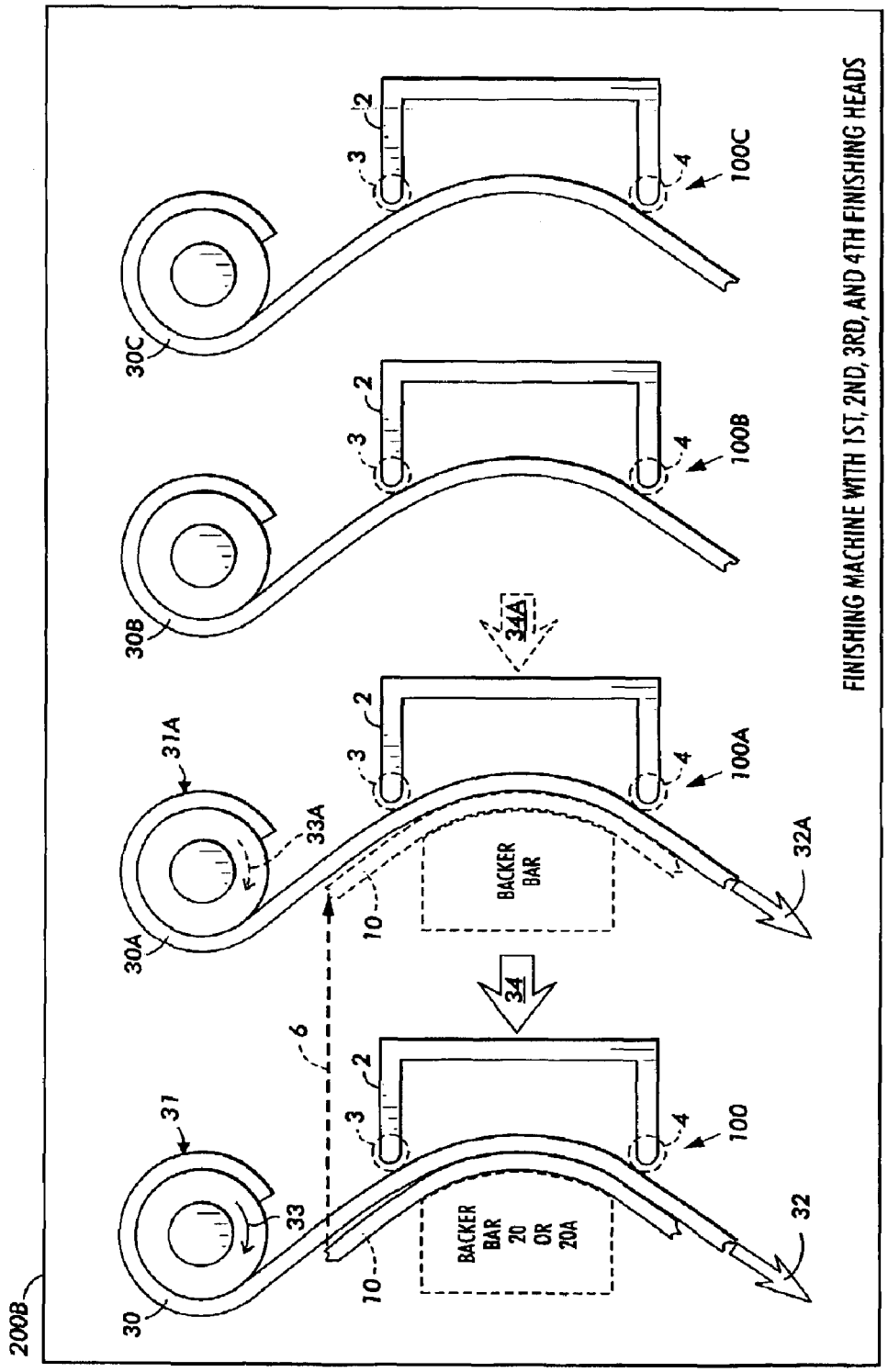
FIG. 2B  FINISHING MACHINE WITH 1ST, 2ND, 3RD, AND 4TH FINISHING HEADS

METHOD OF FINISHING A BELT SEAM USING AN ABRASIVE FINISHING MACHINE, A METHOD OF FINISHING A BELT SEAM USING AN ABRASIVE FINISHING MACHINE HAVING A PLURALITY OF FINISHING HEADS, AND A METHOD OF FINISHING A BELT SEAM USING AN ABRASIVE FINISHING MACHINE HAVING FIRST, SECOND, THIRD AND FOURTH FINISHING HEADS

CROSS-REFERENCE TO RELATED APPLICATION

This is a continuation-in-part of commonly assigned "parent" prior application Ser. No. 09/723,150, filed 27 Nov. 2000, now abandoned, by Paul F. Mastro et al., the same inventors as in the present application the disclosure of which prior application is hereby incorporated by reference verbatim, with the same effect as though such disclosure were fully and completely set forth herein.

INCORPORATION BY REFERENCE OF OTHER U.S. PATENTS

The applicant hereby incorporates by reference the disclosures of the following U.S. patents verbatim and with the same effect as though all such disclosures were fully and completely set forth herein:

U.S. Pat. No. 4,796,387 to James N. Johnson, entitled "Micro-abrasive finishing device", granted 10 Jan. 1989;

U.S. Pat. No. 5,549,999 to Eugene A. Swain et al., entitled "Process for coating belt seams", granted 27 Aug. 1996;

U.S. Pat. No. 5,997,974 to Edward L. Schlueter, Jr. et. al., entitled "Invisible seam electrostatographic belt," granted 7 Dec. 1999;

U.S. Pat. No. 6,068,722 to Robert C. U. Yu et al., entitled "Seam stress release in flexible electrostatographic imaging belts", granted 30 May 2000;

U.S. Pat. No. 5,418,349 to Eugene A. Swain et al., entitled "Process for reducing thickness of a polymeric photoconductive coating on a photoreceptor with laser", granted 23 May 1995;

U.S. Pat. No. 5,549,193 to Edward L. Schlueter, Jr. et al., entitled "Endless seamed belt", granted 27 Aug. 1996;

U.S. Pat. No. 5,612,773 to John S. Berkes et al., entitled "Intermediate transfer member", granted 18 Mar. 1997; and U.S. Pat. No. 6,220,940 to James N. Johnson, entitled "Micro-finishing apparatus," granted 24 Apr. 2001.

FIELD OF THE INVENTION

This application relates generally to belts used in xerography, including intermediate transfer belts, and more particularly to a method of finishing a seam of a belt, including a method of finishing a seam of an intermediate transfer belt.

BACKGROUND OF THE INVENTION

It is known to use seamed belts in xerography. For example, U.S. Pat. No. 5,549,999 to Eugene A. Swain et al., entitled "Process for coating belt seams," in FIG. 1, col. 3, lines 66–67 and col. 4, lines 1–7 discloses a photoreceptor belt 10 including a seam 12.

Further, U.S. Pat. No. 5,997,974 to Edward L. Schlueter, Jr. et al., entitled "Invisible seam electrostatographic belt," in FIG. 1 and col. 6, lines 29–40 discloses an endless belt 10 including a seam 11. Further, this Schlueter, Jr. et al. '974 patent in col. 12, lines 3–18 discloses using a conductive adhesive 48 in forming the belt seam.

Also, U.S. Pat. No. 6,068,722 to Robert C. U. Yu et al., entitled "Seam stress release in flexible electrostatographic imaging belts," in FIG. 2 discloses a multiple-layered seamed flexible electrophotographic imaging belt 10 comprising a seam 30 formed with ultrasonic seaming welding. Further, this Yu et al. patent in col. 9, lines 18–34 discloses other seaming methods, including gluing, taping, stapling, pressure and heat fusing to form a continuous belt.

It is also known to finish the seams of such belts. For example, U.S. Pat. No. 6,418,349 to Eugene A. Swain et al., entitled "Process for reducing thickness of a polymeric photoconductive coating on a photoreceptor with laser," in FIGS. 6–7 and col. 6, lines 40–50 discloses a photoreceptor belt 22 with seam 24, with the seam 24 being finished by a laser beam 10 in order to remove excess seam material.

Further, U.S. Pat. No. 5,549,193 to Edward L. Schlueter, Jr. et al., entitled "Endless seamed belt," in col. 4, lines 47–55 discloses finishing a seam of a photoreceptor belt by means of air, ultrasonics or brushing. Further, this Schlueter, Jr. et al. '193 patent in col. 5, lines 39–51 discloses forming a photoreceptor belt seam by means of conventional adhesives, and then finishing the seam by means of buffing or sanding.

It is also known to use intermediate transfer belts in xerography. For example, U.S. Pat. No. 5,612,773 to John S. Berkes et al., entitled "Intermediate; transfer member," in FIG. 1 discloses using an intermediate transfer belt 28 in an electrophotographic printing machine.

However, there are problems associated with using a seamed belt for an intermediate transfer belt application. One problem is whether the latent image can be satisfactorily applied to the seamed portion of the belt or, in other words, whether the seam itself is "imageable." This problem of belt seam imaging is noted in the foregoing John S. Berkes et al. patent wherein it is disclosed in col. 5, lines 32–42 that "the use of a seamless belt construction is important in that a seamed belt would require synchronization to prevent the seam from interfering with the image."

Despite the foregoing problem with seam imaging, it is known to use a seamed belt as an intermediate transfer belt. In order to achieve a seamed intermediate transfer belt, however, the belt seam must be finished to make it imageable. As a result, currently such a belt seam is hand-sanded and polished in order to achieve a seam finish that will render the seam imageable, and thereby allow the belt to be used as an intermediate transfer belt. Such manual hand-finishing techniques have inherent limitations, of course, including quality control, throughput, efficiency and cost.

Abrasive finishing machines are known. For example, James N. Johnson, "Micro-abrasive finishing device," U.S. Pat. No. 4,796,387, granted 10 Jan. 1989, discloses such an abrasive finishing machine. Further, it is known to use such abrasive finishing machines to achieve mechanized high-quality finishing of fuser rollers that are then used in xerographic printing machines. To date, however, it is not known to use a finishing machine to achieve a finished belt seam that is sufficiently imageable to allow the seamed belt to be used as an intermediate transfer belt.

The problem is how to use an abrasive finishing machine to finish the seam of a seamed intermediate transfer belt to achieve a finished seam that is imageable.

BRIEF SUMMARY OF THE INVENTION

In a first aspect of the invention, there is described a method of finishing a seam of a belt, the belt comprising a belt outer surface and a belt inner surface, the seam comprising a seam outer surface of a seam width with adhesive material disposed thereon, the method comprising providing an abrasive finishing machine including an abrasive finishing media with a finishing surface, the method further comprising providing a backer bar, the backer bar comprising a backer bar surface with a backer surface curvature based on a backer bar radius, the method comprising:

(a) positioning the backer bar surface against the belt inner surface so that the belt outer surface contacts the finishing surface to define a finishing contact arc with respect to the backer bar radius;
(b) applying a tension, a feed rate and a pressure to the finishing media; and
(c) using the finishing machine, finishing the seam to remove the adhesive material.

In a second aspect of the invention, there is described a method of finishing a seam of a belt, the belt comprising a belt outer surface and a belt inner surface, the seam comprising a seam width, the method comprising providing a finishing machine having a plurality of finishing heads, wherein a first finishing head of the plurality of finishing heads comprises a first finishing media and a second finishing head of the plurality of finishing heads comprises a second finishing media, the method further comprising providing a backer bar, the backer bar comprising a backer bar radius, the method further comprising, at the first finishing head:

(a) positioning the backer bar against the belt inner surface so that the belt outer surface contacts the first finishing media to define a finishing contact arc with respect to the backer bar radius;
(b) applying a tension, a feed rate and a pressure to the first finishing media; and
(c) finishing the seam with the first finishing media.

In a third aspect of the invention, there is described a method of finishing a seam of a belt, the belt comprising a belt outer surface and a belt inner surface, the seam comprising a seam width, the method comprising providing a finishing machine having a first finishing head comprising a first finishing media, a second finishing head comprising a second finishing media, a third finishing head comprising a third finishing media and a fourth finishing head comprising a fourth finishing media, the method further comprising providing a backer bar, the backer bar comprising a backer bar radius, the method further comprising, at the first finishing head:

(a) positioning the backer bar against the belt inner surface so that the belt outer surface contacts the first finishing media to define a finishing contact arc with respect to the backer bar radius;
(b) applying a tension, a feed rate and a pressure to the first finishing media; and
(c) finishing the seam with the first finishing media.

In a fourth aspect of the invention, there is described an intermediate transfer belt 10' depicted in FIG. 4 comprising a seam 13' that is finished by the process 300 of FIG. 3 in connection with the finishing machine 200 of FIG. 2.

In a fifth aspect of the invention, there is described an intermediate transfer belt 10' depicted in FIG. 4 comprising a seam 13' that is finished by the process 350 of FIG. 3A in connection with the finishing machine 200A of FIG. 2A.

In a sixth aspect of the invention, there is described an intermediate transfer belt 10' depicted in FIG. 4 comprising a seam 13' that is finished by the process 350 of FIG. 3A in connection with the finishing machine 200B of FIG. 2B.

In a seventh aspect of the invention, there is described a printing machine 500 depicted in FIG. 5 comprising an intermediate transfer belt 400 (or element 10') depicted in FIG. 4, the intermediate transfer belt comprising a seam 13' that is finished by the process 300 of FIG. 3 in connection with the finishing machine 200 of FIG. 2.

In an eighth aspect of the invention, there is described a printing machine 500 depicted in FIG. 5 comprising an intermediate transfer belt 400 (or element 10') depicted in FIG. 4, the intermediate transfer belt comprising a seam 13' that is finished by the process 350 of FIG. 3A in connection with the finishing machine 200A of FIG. 2A.

In a ninth aspect of the invention, there is described a printing machine 500 depicted in FIG. 5 comprising an intermediate transfer belt 400 (or element 10') depicted in FIG. 4, the intermediate transfer belt comprising a seam 13' that is finished by the process 350 of FIG. 5A in connection with the finishing machine 200B of FIG. 2B.

BRIEF DESCRIPTION OF THE SEVERAL VIEWS OF THE DRAWING

FIG. 2B depicts an abrasive finishing machine 200B having a first finishing head 100 comprising a first finishing media 30, a second finishing head 100A comprising a second finishing media 30A, a third finishing head 100B comprising a third finishing media 30B and a fourth finishing head 100C comprising a fourth finishing media 30C. Each finishing head of the first finishing head 100, second finishing head 100A, third finishing head 100B and fourth finishing head 100C includes a platen 2. Each platen 2, in turn, optionally includes the finishing media rollers 34 of FIG. 1A. As shown, the first finishing head 100 is arranged with the backer bar 20 of FIG. 1 or the backer bar 20A of FIGS. 1A–1B. The belt 10 is depicted as being finished by the first finishing head 100 with the first finishing media 30.

DETAILED DESCRIPTION OF THE INVENTION

Briefly, in accordance with the present invention, an imageable belt includes a seam that is finished using an abrasive finishing machine. The seam comprises a seam width with adhesive material disposed thereon. The finishing process includes an abrasive finishing media with a finishing surface and a backer bar. The backer bar comprises a backer bar radius. The backer bar surface is positioned against the belt inner surface so that the belt outer surface contacts the finishing surface to define a finishing contact arc with respect to the backer bar radius. A tension, feed rate and pressure are applied to the finishing media. Using the finishing machine, the seam is then finished to remove the adhesive material. The finishing process results in a seam that is imageable. In one embodiment, the backer bar radius is adjusted so that the finishing contact arc covers the seam width.

Figure 1:
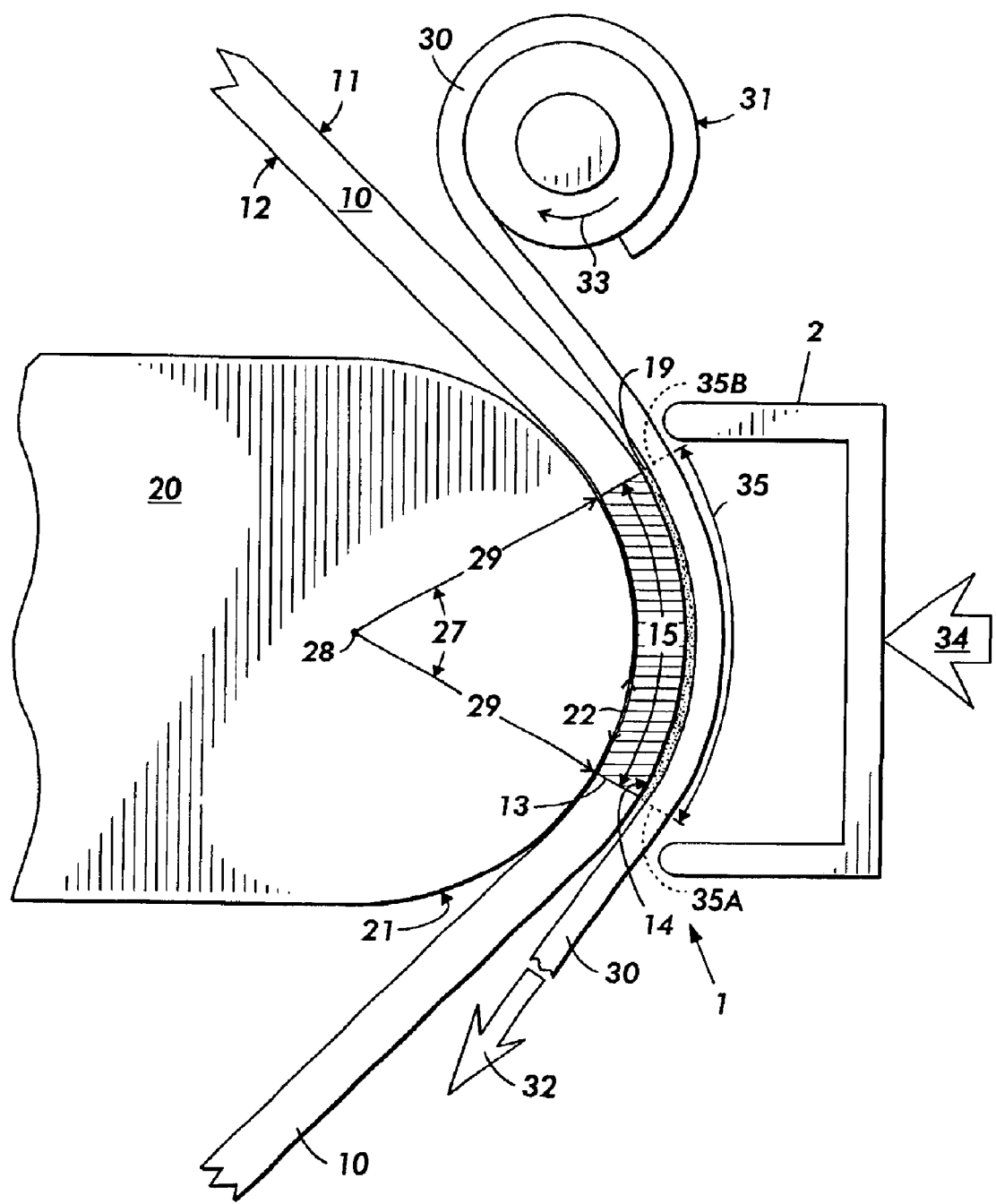
FIG. 1 depicts a finishing station or head 1 of an abrasive finishing machine arranged with a first backer bar 20 and abrasive finishing media 30 to finish a work piece, namely, the seam 13 of a belt 10. As shown, the finishing head 1 includes a platen 2.

Referring now to FIG. 1, there is depicted a finishing station or head 1 of an abrasive finishing machine. There is shown a belt 10, the belt 10 comprising a belt outer surface 11 and a belt inner surface 12. As shown the belt 10 includes a seam 13, the seam 13 comprising a seam outer surface 14 of a seam width 15 with adhesive material 19 disposed thereon.

Still referring to FIG. 1, there is shown a first backer bar 20 with a backer bar surface 21. As shown, the backer bar 20 comprises a backer bar center 28 and a backer bar surface 21. Also as shown, the backer bar surface 21 is characterized by a backer surface curvature 22 based on a backer bar radius 29.

Still referring to FIG. 1, there is also shown an abrasive finishing media 30 with a finishing surface 31.

As shown in FIG. 1, the finishing head 1 includes a channel platen 2. As shown, a pressure 34 causes the platen 2 to engage the abrasive finishing media 30. As a result, the pressure 34 is thereby applied to the finishing media 30.

Figure 1A:
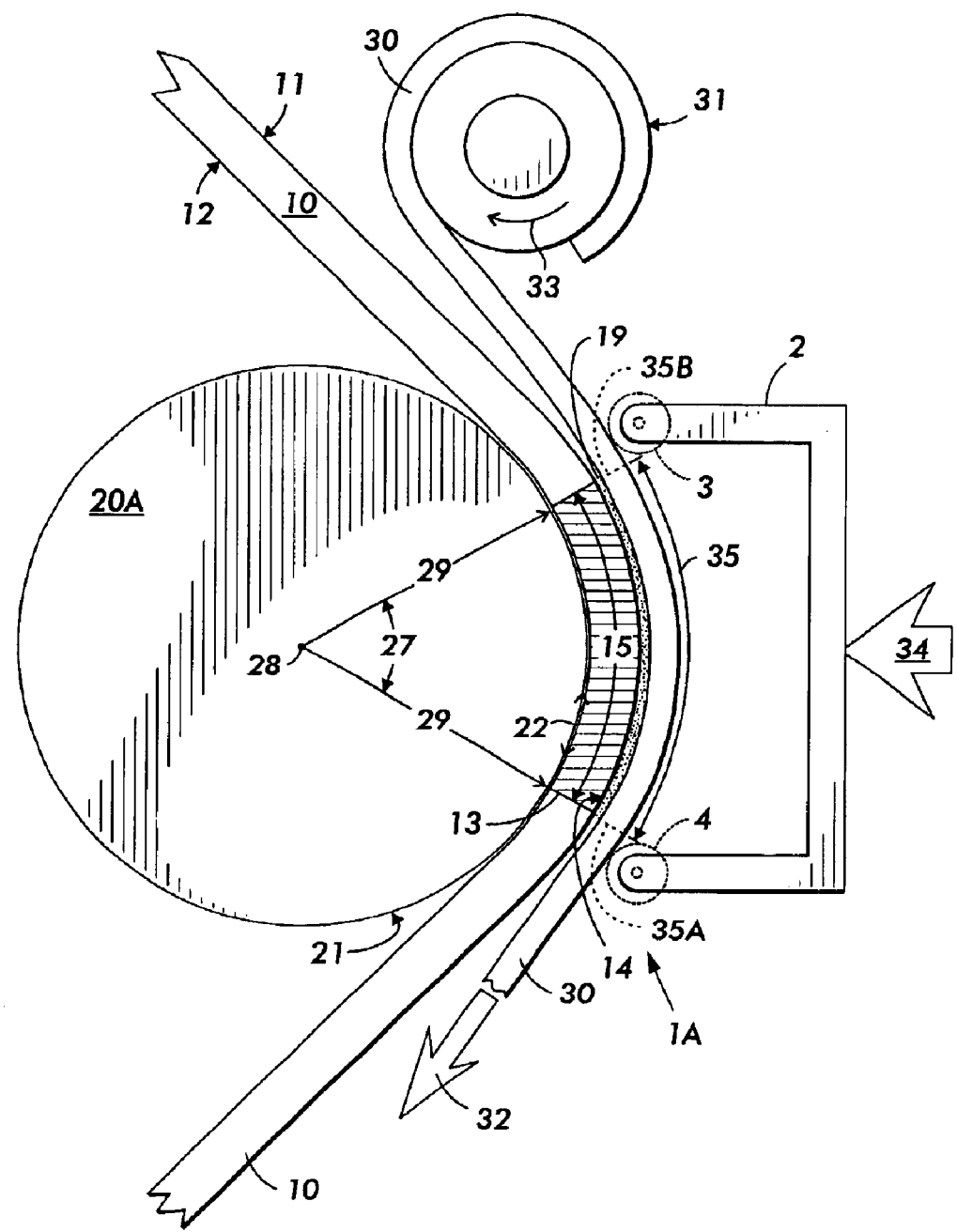
FIG. 1A depicts a finishing head 1A of an abrasive finishing machine arranged with a second backer bar 20A and abrasive finishing media 30 to finish the seam 13 of the belt 10. As shown, the finishing head 1A includes a platen 2 arranged with finishing media rollers 3 and 4.

Referring now to FIG. 1A, there is depicted a finishing head 1A of an abrasive finishing machine arranged with a second backer bar 20A.

Figure 1B:
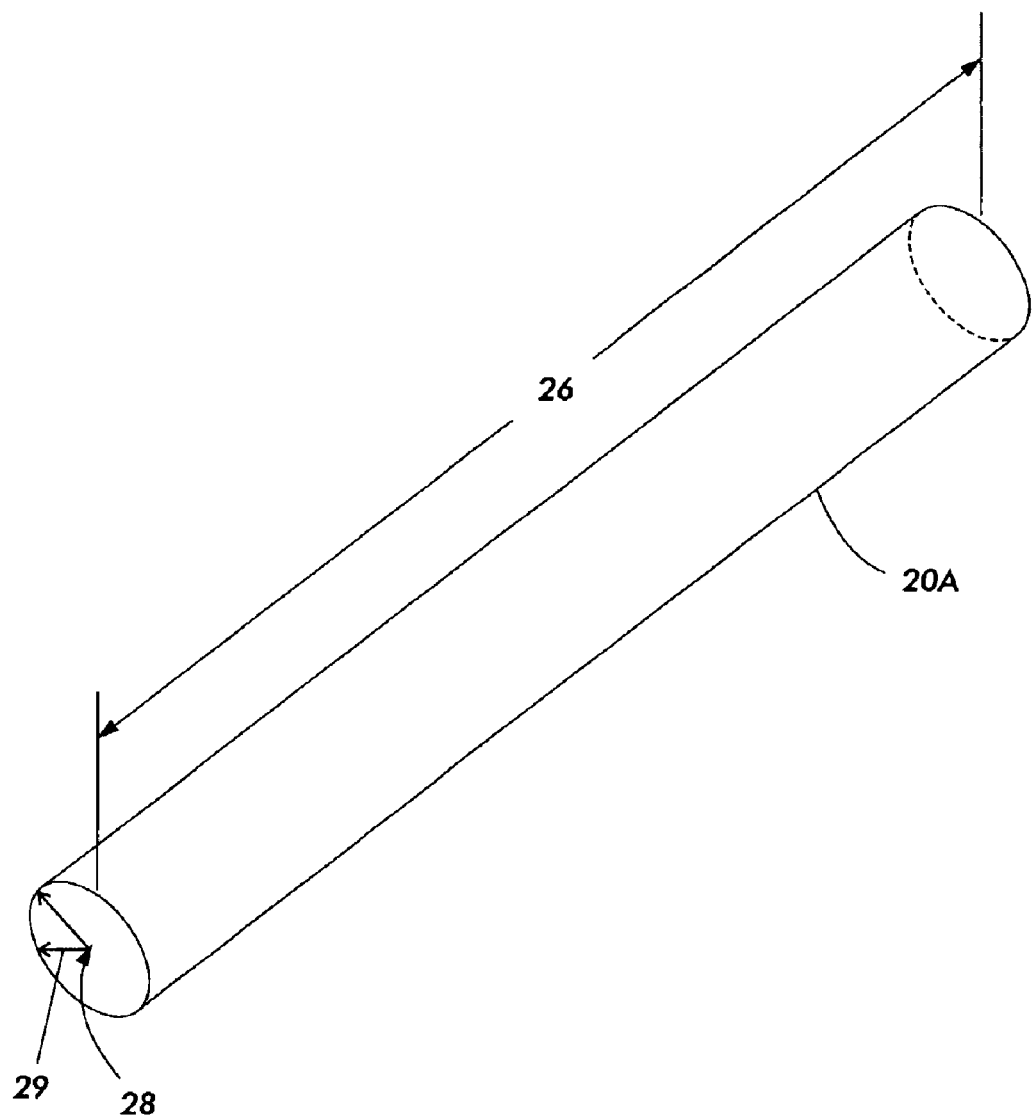
FIG. 1B depicts an elevated side view of the backer bar 20A of FIG. 1A.

Referring now to FIG. 1B, there is depicted an elevated side view of the backer bar 20A of FIG. 1A. As shown, the backer bar 20A is cylindrical shaped.

Referring still to FIG. 1B, in one embodiment, the backer bar 20A has a backer bar radius 29 of about 1 and 5/8 inches. In one embodiment, the backer bar 20A has a length 26 of between 16 and 17 inches.

Returning again to FIG. 1A, as depicted therein, the channel platen 2 includes two cylindrical-shaped finishing media rollers 3 and 4. As shown, the pressure 34 causes the platen 2 to engage the abrasive finishing media 30 by means of the included rollers 3 and 4. As a result, the pressure 34 is thereby applied to the finishing media 30.

Figure 2:
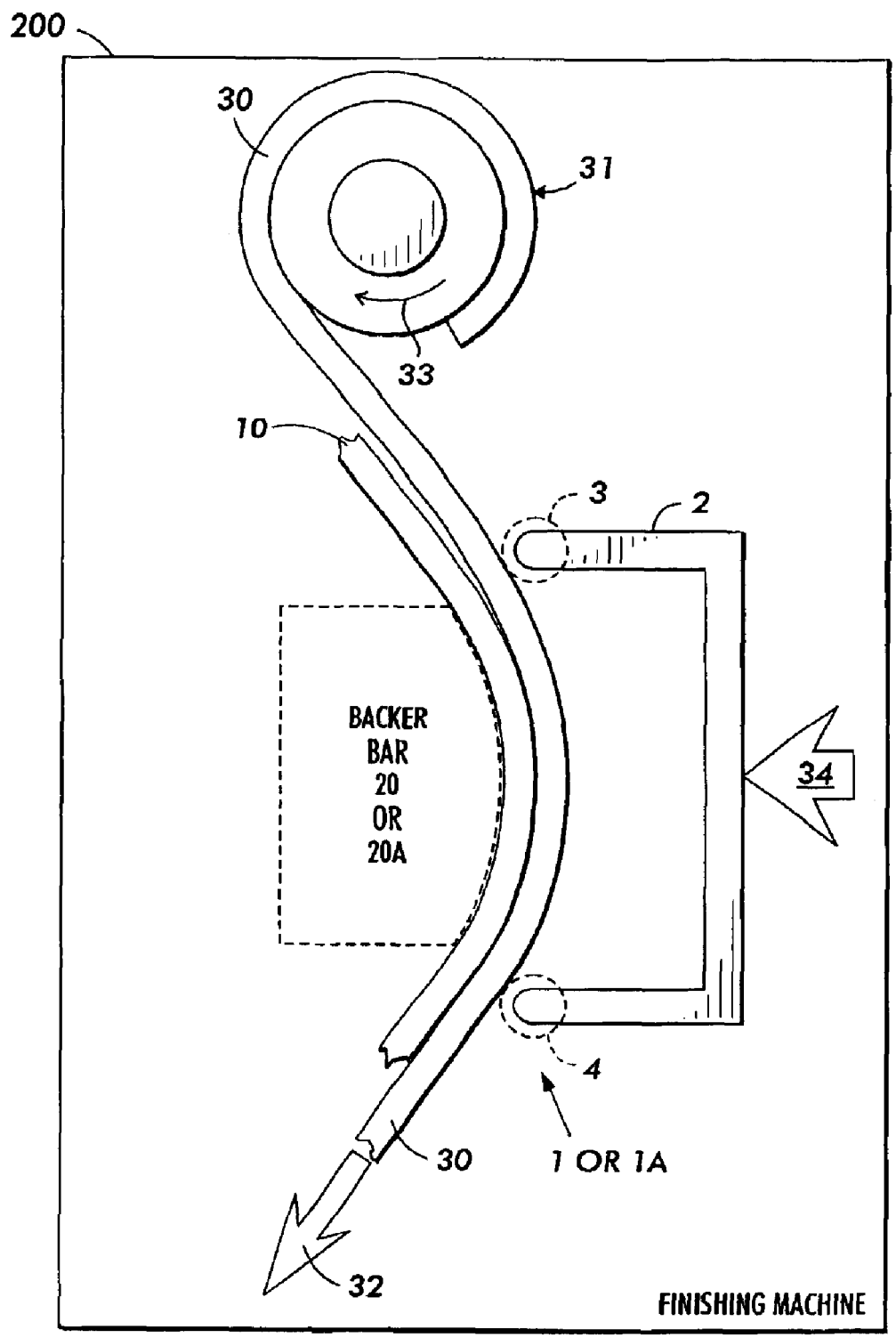
FIG. 2 depicts an abrasive finishing machine 200 arranged with the finishing head 1 and backer bar 20 of FIG. 1 or the finishing head 1A and backer bar 20A of FIGS. 1A–1B. The finishing head 1 or 1A includes a platen 2. In one embodiment, the platen 2 includes the finishing media rollers 3 and 4 of FIG. 1A. As shown, the finishing machine 200 is arranged to finish the belt 10 with the finishing media 30.

Referring now to FIG. 2, there is depicted an abrasive finishing machine 200 arranged with either the finishing head 1 and backer bar 20 of FIG. 1 or the finishing head 1A and backer bar 20A of FIGS. 1A–1B. The finishing head 1 or 1A comprises the channel platen 2 and the abrasive finishing media 30 described above in connection with FIGS. 1 and 1A, together with depicted elements 31 through 34 that are described in connection with FIG. 3 below. In one embodiment, the channel platen 2 includes the finishing media rollers 3 and 4 of FIG. 1A, shown in broken lines. As shown, the finishing machine 200 is arranged to finish the belt 10.

Still referring to FIG. 2, in one embodiment the finishing machine 200 comprises a "superfinisher" Micro Finishing System, Model 16150, as obtained from Grinding Equipment and Machinery Company, 15 South Worthington Street, Youngstown, Ohio 44502, phone number 330-747-2313, website address equipped with a 16-inch superfinishing head. The foregoing finishing machine Model 16150 is the subject of U.S. Pat. No. 4,796,387 to James N. Johnson, entitled "Micro-abrasive finishing device", granted 10 Jan. 1989, which patent is incorporated by reference hereinabove.

Still referring to FIG. 2, in one embodiment the finishing media rollers 3 and 4 comprise superfinisher slack head rollers, part number 22094, available from the Grinding Equipment and Machinery Company described above. Each roller has a diameter of about 1 and 3/4 inches and a length of about 16 and 1/8 inches.

Figure 2A:
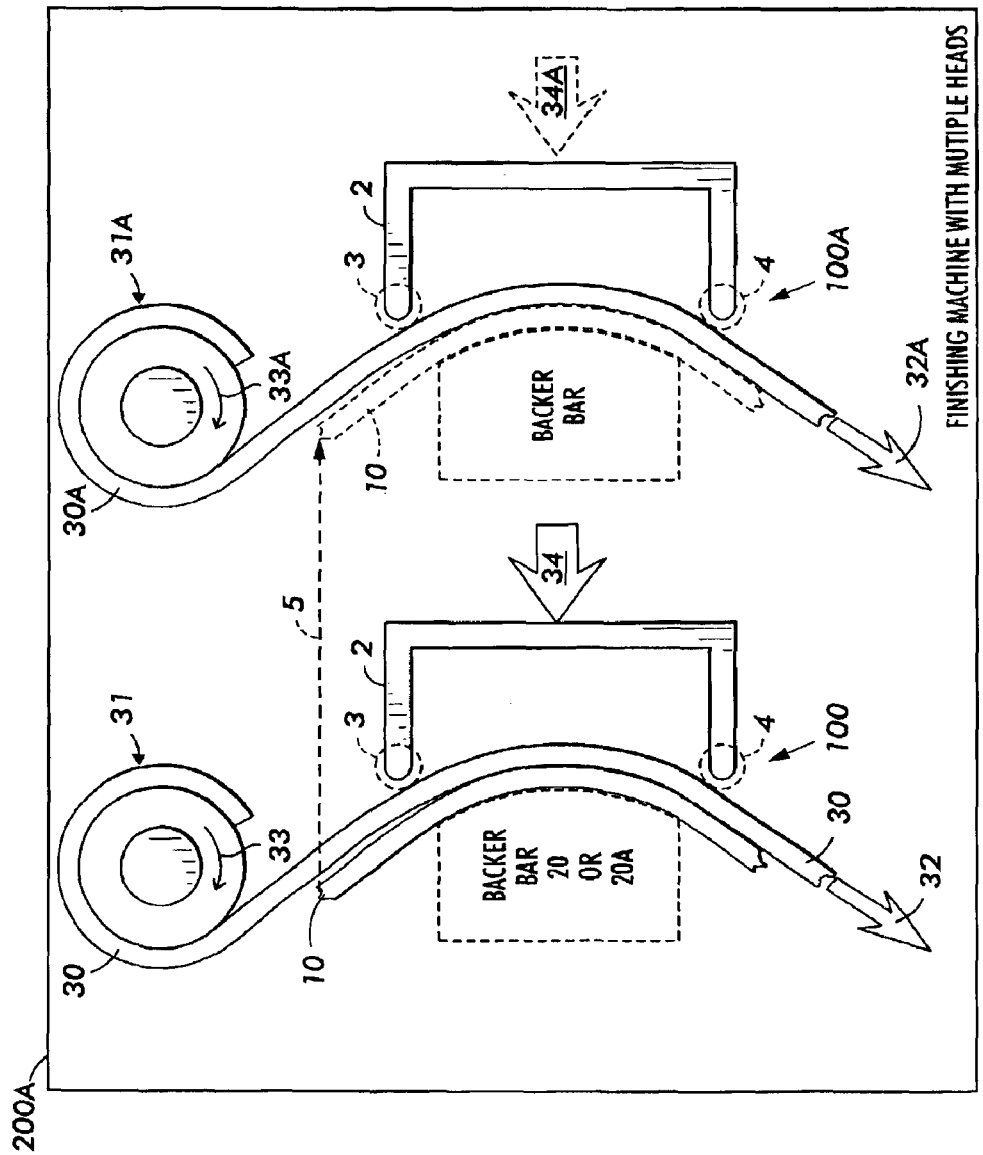
FIG. 2A depicts an abrasive finishing machine 200A having a plurality of finishing heads comprising a first finishing head 100 and a second finishing head 10A. The first finishing head 100 includes a first abrasive finishing media 30 and a first platen 2. In one embodiment, the first platen 2 includes the finishing media rollers 3–4 of FIG. 1A. The second finishing head 100A includes a second abrasive finishing media 30A and a second platen 2. In one embodiment, the second platen 2 includes the finishing media rollers 3–4 of FIG. 1A. As shown, the first finishing head 100 is arranged with the backer bar 20 of FIG. 1 or the backer bar 20A of FIGS. 1A–1B. The belt 10 is depicted as being finished by the first finishing head 100 with the first finishing media 30.

Referring now to FIG. 2A there is depicted an abrasive finishing machine 200A having a plurality of finishing heads comprising without limitation a first finishing head 100 and a second finishing head 100A.

While the finishing machine 200A is depicted as comprising exactly two (2) finishing heads 100 and 100A, it will be understood that various embodiments of the finishing machine 200A comprise various quantities of finishing heads.

The following finishing machine 200A embodiments are provided for illustrative purposes only, and are not intended to be exhaustive or limiting:

In a first embodiment, the finishing machine 200A comprises exactly two (2) finishing heads.

In a second embodiment, the finishing machine 200A comprises exactly three (3) finishing heads.

In a third embodiment, the finishing machine 200A comprises exactly four (4) finishing heads.

In a fourth embodiment, the finishing machine 200A comprises exactly five (5) finishing heads.

In a fifth embodiment, the finishing machine 200A comprises exactly six (6) finishing heads.

In a further embodiment, the finishing machine 200A comprises an arbitrary quantity (n) of finishing heads, where n equals an integer equal to or greater than 2. Thus, n equals 2, 3, 4, 5, 6, 7, 8, 9, etc.

Still referring to FIG. 2A, the first finishing head 100 includes a first abrasive finishing media 30 and a first platen 2. In one embodiment, the first platen 2 includes the finishing media rollers 3–4 of FIG. 1A, shown in broken lines. The second finishing head 100A includes a second abrasive finishing media 30A and a second platen 2. In one embodiment, the second platen 2 includes the finishing media rollers 34 of FIG. 1A, shown in broken lines. The first finishing head 100 is, arranged with either the backer bar 20 of FIG. 1 or the backer bar 20A of FIGS. 1A–1B. The belt 10 is depicted as being finished by the first finishing head 100 with the first finishing media 30.

Still referring to FIG. 2A, in one embodiment, after initial finishing by the first finishing media 30 at the first finishing head 100, the belt 10 is then moved or repositioned (as depicted by the arrow 5) to the second finishing head 100A for further finishing by the second finishing media 30A. In FIG. 2A the reconfiguring of the belt 10 from the first finishing head 100 to the second finishing head 100A is depicted by the arrow 5 and the belt 10 being shown in broken lines at the second finishing head 100A.

When the belt 10 has been positioned at the second finishing head 100A, the belt 10 thereupon receives further finishing with the second finishing media 30A. This further finishing at the second finishing head 100A includes applying a tension 32A, a feed rate 33A and a pressure 34A to the second finishing media 30A, thus causing the belt 10 to contact the finishing surface 31A of the second finishing media 30A.

Still referring to FIG. 2A, in one embodiment the finishing machine 200A comprises a "G. E. M. 4-Head Microfinisher", as obtained from Grinding Equipment and Machinery Company, 15. South Worthington Street, Youngstown, Ohio 44502, phone number 330-747-2313.

Referring now to FIG. 2B, there is depicted an abrasive finishing machine 200A having a first finishing head 100 comprising a first finishing media 30, a second finishing head 100A comprising a second finishing media 30A, a third finishing head 100B comprising a third finishing media 30B and a fourth finishing head 100C comprising a fourth finishing media 30C. Each finishing head of the first finishing head 100, second finishing head 100A, third finishing head 100B and fourth finishing head 100C includes a platen 2. Each platen 2, in turn, optionally includes the finishing media rollers 3–4 of FIG. 1A. As shown, the first finishing head 100 is arranged with either the backer bar 20 of FIG. 1 or the backer bar 20A of FIGS. 1A–1B. The belt 10 is depicted as being finished by the first finishing head 100 with the first finishing media 30.

Still referring to FIG. 2B, in one embodiment, after a first finishing by the first finishing media 30 at the first finishing head 100, the belt 10 is then moved or repositioned (as depicted by the arrow 6) to the second finishing head 100A for a second finishing by the second finishing media 30A. In FIG. 2B the reconfiguring of the belt 10 from the first finishing head 100 to the second finishing head 100A is depicted by the arrow 6 and the belt 10 being shown in broken lines at the second finishing head 100A.

When the belt 10 has been positioned at the second finishing head 100A, the belt 10 thereupon receives the second finishing with the second finishing media 30A. This second finishing at the second finishing head 100A includes applying a tension 32A, a feed rate 33A and a pressure 34A to the second finishing media 30A, thus causing the belt 10 to contact the finishing surface 31A of the second finishing media 30A.

Still referring to FIG. 2B, after the second finishing by the second finishing head 100A with the second finishing media 30A, in one embodiment, the belt 10 is repositioned to the third finishing head 100B for a third finishing with the third finishing media 30B.

Still referring to FIG. 2B, after the third finishing by the third finishing head 100B with the third finishing media 30B, in one embodiment, the belt 10 is repositioned to the fourth finishing head 100C for a fourth finishing with the fourth finishing media 30C.

Still referring to FIG. 2B, in one embodiment the finishing machine 200B comprises a "G. E. M. 4-Head Microfinisher", as obtained from Grinding Equipment and Machinery Company, 15 South Worthington Street, Youngstown, Ohio 44502, phone number 330–747-2313.

Figure 3:
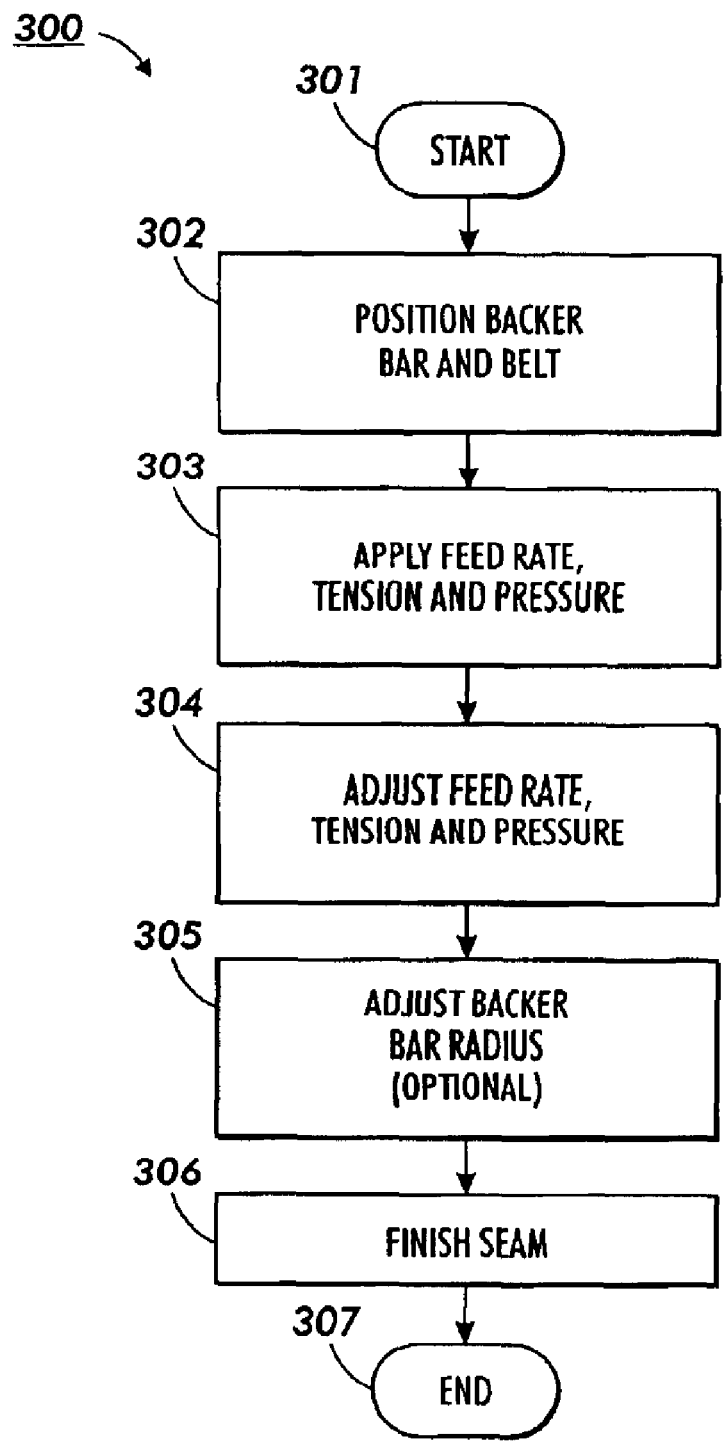
FIG. 3 depicts a process 300 of finishing a belt seam in connection with the finishing machine 200 of FIG. 2.

Referring now to FIG. 3, there is depicted a process 300 of finishing the belt seam 13 in connection with the finishing machine 200 of FIG. 2.

As shown in FIG. 3, the process starts, step 301, and then goes to step 302.

In step 302, the backer bar surface 21 of the backer bar 20 of FIG. 1 or the backer bar 20A of FIGS. 1A–1B is positioned against the belt inner surface 12 so that the belt outer surface 11 contacts the finishing surface 31 to define a finishing contact arc 35 with respect to the backer bar radius 29 and backer bar center 28.

For good understanding, as shown in FIG. 1, the finishing contact arc 35 is defined by a first arc end 35A and a second arc end 35B. Thus defined, it will be understood that the finishing surface 31 and the belt outer surface 11 contact each other in the regions of the finishing surface 31 and the belt outer surface 11 that exist BETWEEN the first arc end 35A and the second arc end 35B. It will be further understood that the finishing arc 35 is based on several factors, such factors including, but not limited to, the backer bar radius 29 and the backer bar center 28.

The process then goes to step 303.

In step 303, a tension 32, a feed rate 33 and the pressure 34 are applied to the abrasive finishing media 30. In one embodiment, for example, the feed rate and pressure are initially set to achieve removal of the adhesive material 19. Also in this embodiment, the tension is initially set to achieve the desired seam coverage. The process then goes to step 304.

In step 304, the tension, pressure and feed rate are adjusted as required. In one embodiment, for example, the pressure is adjusted to achieve the desired surface finish. After step 304, in one embodiment, the process goes to the optional step 305.

In step 305, the backer bar radius 29 of the backer bar 20 of FIG. 1 or the backer bar 20A of FIGS. 1A–1B is adjusted so that the finishing contact arc 35 covers the seam width 15.

In one embodiment, the backer bar radius 29 is adjusted by grinding the backer bar 20 of FIG. 1 or the backer bar 20A of FIGS. 1A–1B.

In one embodiment, for example, the backer bar radius adjusting step 305 results in a finishing contact arc 35 that overlaps the seam width 15 by no more than 10%.

Returning to FIG. 3, upon completing step 305, the process goes to step 306.

In step 306, the finishing machine 200 finishes the seam 13 in the finishing contact arc 35 to remove the adhesive material 19. With cross-reference to FIGS. 1 and 1A, the pressure 34 urges the finishing surface 31 towards the belt outer surface 11 as the finishing machine 200 moves the finishing surface 31 orthogonal to the seam 13 at the feed rate 31 while oscillating the finishing surface 31 parallel to the seam 13. As a result of this finishing process step 306, the adhesive material 19 is removed from the seam outer surface 14.

Upon satisfactorily completing step 306, the process ends, step 307.

In one embodiment, the belt 10 comprises an intermediate transfer belt that may be used in a xerographic printing machine.

In another embodiment, the seam finishing step 306 results in a finished seam 13 that is imageable.

The following example is provided for good understanding.

In step 302, an initial backer bar 20 or 20A is selected, the initial backer bar 20 or 20A having an initial backer bar radius 29 equal to 50 mm. The backer bar 20 or 20A and belt 10 are positioned so that the belt inner surface 12 contacts the backer bar surface 21 in a backer contact arc 25 and the belt outer surface 11 contacts the finishing surface 31 in a finishing contact arc 35.

In step 303, the feed rate 33 initially is set to 20 centimeter per minute, the pressure 34 initially is set to 19 pounds per square inch and the tension 32 initially is set to 90 pounds.

In step 304, the pressure 34 is re-adjusted to 22 pounds per square inch and the tension 32 is re-adjusted to 80 pounds.

In step 305, the backer bar radius 29 is adjusted in order to optimize the finishing contact arc 35. The adjusting process is described below.

First, the seam width 15 is measured at 4.55 mm.

Second, it is desired to have the finishing contact arc 35 overlap the seam width 15 by about 10%. As a result, the desired finishing contact arc 35 is computed as 4.55 mm times 110% equals 5.005 mm, which is rounded to 5.0 mm.

Third, based on the present initial backer bar 20 or 20A with an initial bar radius 29 of 50 mm, the present finishing contact arc 35 is measured at 4.6 mm.

Fourth, calculate the angle 27 from the initial backer bar center 28 as 4.6 mm divided by 50 mm equals 0.0920 radians.

Fifth, calculate the desired adjusted radius 29 as 5.0 mm (desired finishing contact arc 35) divided by 0.0920 radians equals 54.3478 mm, which is rounded to 55 mm.

Sixth, the initial backer bar 20 or 20A is discarded and a new backer bar 20 or 20A is fabricated (by grinding) to achieve the desired backer bar radius 29 of 55 mm.

In summary, in step 305, the backer bar radius 29 is adjusted to a value of 55 mm in order to optimize the finishing contact arc 35 to a value of 5.0 mm.

In step 306, using the new backer bar 20 or 20A with the adjusted backer bar radius 29 of 55 mm, the seam 13 is finished for a time period of about 5 minutes.

Figure 3A:
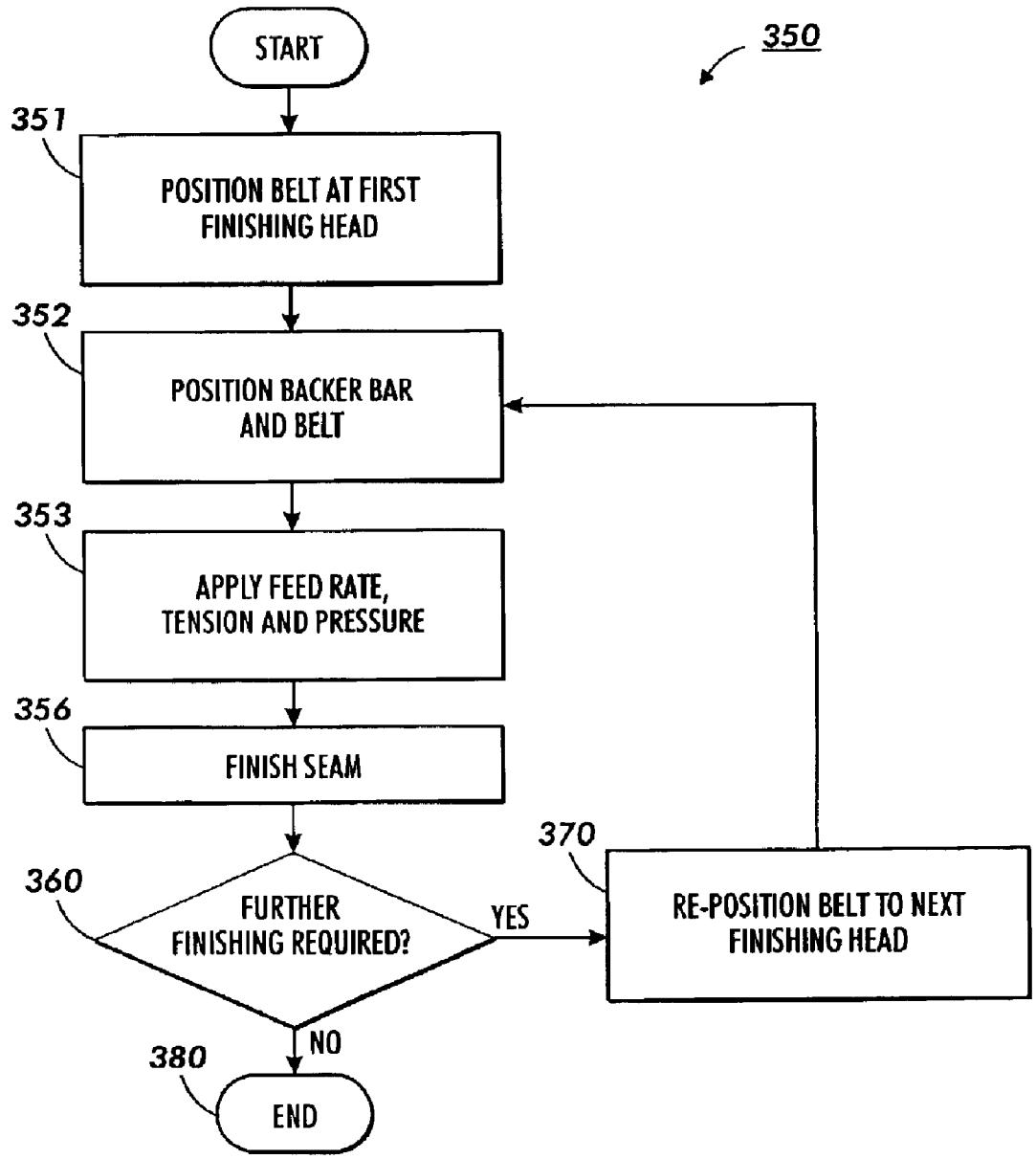
FIG. 3A depicts a process 350 of finishing a belt seam in connection with the finishing machine 200A of FIG. 2A or the finishing machine 200B of FIG. 2B.

Referring now generally to the process 300 of FIG. 3A, in one embodiment, the backer bar radius adjusting step 305 is omitted. In this embodiment, therefore, after the adjusting step 304 the process 300 goes directly to the finishing step 306.

Referring now to FIG. 3A, there is depicted a process 350 of finishing a seam 13 of a belt 10 in connection with the finishing machine 200A of FIG. 2A or the finishing machine 200B of FIG. 2B. The belt 10 comprises a belt outer surface 11 and a belt inner surface 13, and the seam 13 comprises a seam width 15. Each finishing machine of the finishing machine 200A of FIG. 2A and the finishing machine 200B of FIG. 2B includes a plurality of finishing heads, wherein a first finishing head 100 comprises a first finishing media 30 and a second finishing head 100A comprises a second finishing media 30A. Further, the finishing machine 200B of FIG. 2B includes a third finishing head 100B comprising a third finishing media 30B and a fourth finishing head 100C comprising a fourth finishing media 30C.

The process 350 of FIG. 3A is now described.

In step 351 the belt 10 is positioned at the first finishing head 100. As depicted in FIGS. 2A–2B, the first finishing head 100 comprises a first finishing media 30. The process then goes to step 352.

In step 352, the backer bar 20 or 20A is positioned (as depicted in FIG. 1 or FIG. 1A) against the belt inner surface 12 so that the belt outer surface 11 contacts the finishing surface of the finishing media to define a finishing contact arc 35 with respect to the backer bar radius 29. The process then goes to step 353.

In step 353, a tension 32, feed rate 33 and pressure 34 are applied to the finishing media. The process then goes to step 356.

In step 356, the belt seam is finished by the finishing media. The process then goes to step 360.

In step 360, the process determines whether further finishing of the belt 10 is required.

When step 360 determines that further finishing of the belt 10 is required, then the step 360 result is positive, and the process goes to step 370.

In step 370, the belt 10 is moved or repositioned to the next finishing head. The process then repeats the steps 352, 353 and 356, as described above.

Returning now to step 360, when step 360 determines that further finishing of the belt 10 is not required, then the step 360 result is negative, and the process goes to step 380.

In step 380, the finishing process ends.

Referring generally to the process 350 of FIG. 3A, it will be understood that the backer bar 20 or 20A of step 352 comprises a backer bar radius 29 that, in one embodiment, is adjusted so that the finishing contact arc 35 covers the seam width 15.

Still referring to FIG. 3A, in one embodiment, the belt 10 is finished by the process 350 of FIG. 3A in connection with the finishing machine 200B of FIG. 2B.

The process 350 of FIG. 3A is now described in connection with the finishing machine 200B of FIG. 2B.

In step 351 the belt 10 is positioned at the first finishing head 100. The process then goes to step 352.

In step 352, the backer bar 20 or 20A is positioned (as depicted in FIG. 1 or FIG. 1A) against the belt inner surface 12 so that the belt outer surface 11 contacts the finishing surface of the first finishing media 30 to define a finishing contact arc 35 with respect to the backer bar radius 29. The process then goes to step 353.

In step 353, a tension 32, feed rate 33 and pressure 34 are applied to the first finishing media 30. The process then goes to step 356.

In step 356, the seam is finished with the first finishing media 30. The process then goes to step 360.

In step 360, the process makes a positive ("yes") determination as to whether further finishing of the belt 10 is required. As a result, the process goes to step 370, where the belt 10 is moved or repositioned to the next or, in this case, the second finishing head 100A. The process then returns to step 352.

The process then repeats the steps 352, 353 and 356, as described above. As a result of these steps 352, 353 and 356, the belt 10 is finished by the second finishing head 100A and the second finishing media 30A.

The process then goes to step 360.

In step 360, the process again makes a positive ("yes") determination as to whether further finishing of the belt 10 is required. As a result, the process goes to step 370, where the belt 10 is moved or repositioned to the next or, in this case, the third finishing head 100B. The process then returns to step 352.

The process then repeats the steps 352, 353 and 356, as described above. As a result of these steps 352, 353 and 356, the belt 10 is finished by the third finishing head 100B and the third finishing media 30B.

The process then goes to step 360.

In step 360, the process again makes a positive ("yes") determination as to whether further finishing of the belt 10 is required. As a result, the process goes to step 370, where the belt 10 is moved or repositioned to the next or, in this case, the fourth finishing head 100C. The process then returns to step 352.

The process then repeats the steps 352, 353 and 356, as described above. As a result of these steps 352, 353 and 356, the belt 10 is finished by the fourth finishing head 100C and the fourth finishing media 30C.

The process then goes to step 360.

In step 360, the process now makes a negative ("no") determination as to whether further finishing of the belt 10 is required. As a result, the process goes to step 380, where the finishing process ends.

Figure 4:
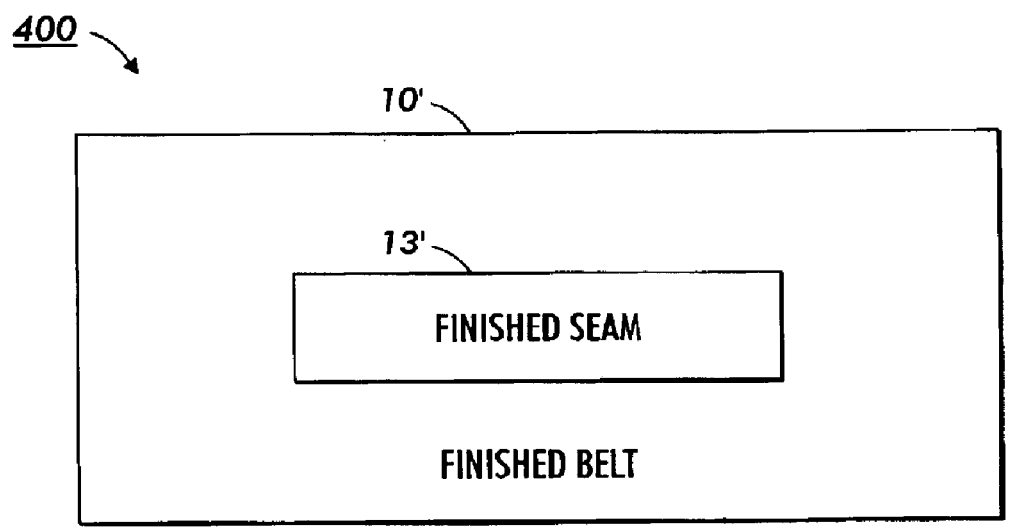
FIG. 4 depicts an intermediate transfer belt 400 (element 10') with a seam 13' that has been finished by the process 300 of FIG. 3 in connection with the finishing machine 200 of FIG. 2 or by the process 350 of FIG. 3A in connection with the finishing machine 200A of FIG. 2A or the finishing machine 200B of FIG. 2B.

Referring now to FIG. 4, there is a block diagram 400 depicting an intermediate transfer belt 10'. As shown, the intermediate transfer belt 10' comprises a seam 13' that has been finished by the process 300 of FIG. 3 in connection with the finishing machine 200 of FIG. 2 or by the process 350 of FIG. 3A in connection with the finishing machine 200A of FIG. 2A or the finishing machine 200B of FIG. 2B. Still referring to FIG. 4, in one embodiment, the finishing process 300 results in the finished seam 13' being imageable.

Figure 5:
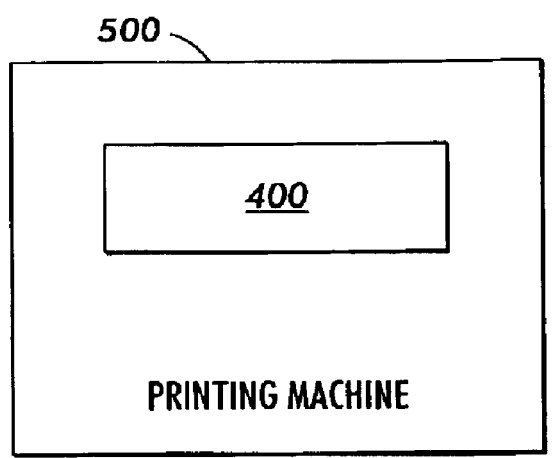
FIG. 5 depicts a printing machine 500 comprising the intermediate transfer belt 400 of FIG. 4.

Referring now to FIG. 5, there is depicted a printing machine 500 comprising the finished intermediate transfer belt 400 of FIG. 4.

In summary, there has been described a method of finishing a seam 13 of a belt 10, the belt comprising a belt outer surface 11 and a belt inner surface 12, the seam 13 comprising a seam outer surface 14 of a seam width 15 with adhesive material 19 disposed thereon, the method comprising providing an abrasive finishing machine 200 as described in connection with FIG. 2 including an abrasive finishing media 30 with a finishing surface 31, the method further comprising providing a backer bar 20 of FIG. 1 or 20A of FIG. 2, the backer bar 20 or 20A comprising a backer bar surface 21 with a backer surface curvature 22 based on a backer bar radius 29, the method comprising the process 300 described in connection with FIG. 3 of:

(a) in step 302, position the backer bar surface 21 against the belt inner surface 12 so that the belt outer surface 11 contacts the finishing surface 31 to define a finishing contact arc 35 with respect to the backer bar radius 29;

(b) in step 303, apply a tension 32, a feed rate 33 and a pressure 34 to the finishing media 30; and (c) in step 306, using the finishing machine 200, finish the seam 13 to remove the adhesive material 19.

In continued summary, there has been described a method of finishing a seam 13 of a belt 10, the belt comprising a belt outer surface 11 and a belt inner surface 12, the seam 13 comprising a seam width 15, the method comprising providing a finishing machine 200A described in connection with FIG. 2A having a plurality of finishing heads 100–100A, wherein a first finishing head 100 of the plurality of finishing heads comprises a first finishing media 30 and a second finishing head 100A of the plurality of finishing heads comprises a second finishing media 30A, the method further comprising providing a backer bar 20 of FIG. 1 or 20A of FIG. 1A, the backer bar 20 or 20A comprising a backer bar radius 29, the method further comprising the process 350 described in connection with FIG. 3A of, at the first finishing head 100:

(a) in step 352, positioning the backer bar 20 or 20A against the belt inner surface 12 so that the belt outer surface 11 contacts the finishing surface 31 of the first finishing media 30 to define a finishing contact arc 35 with respect to the backer bar radius 29;

(b) in step 353, applying a tension 32, a feed rate 33 and a pressure 34 to the first finishing media 30; and (c) in step 354, finishing the seam 13 with the first finishing media 30.

In continued summary, there has been described a method of finishing a seam 13 of a belt 10, the belt comprising a belt outer surface 11 and a belt inner surface 12, the seam 13 comprising a seam width 15, the method comprising providing a finishing machine 200B described in connection with FIG. 2B having a first finishing head 100 comprising a first finishing media 30, a second finishing head 100A comprising a second finishing media 30A, a third finishing head 100B comprising a third finishing media 30B and a fourth finishing head 100C comprising a fourth finishing media 30C, the method further comprising providing a backer bar 20 of FIG. 1 or 20A of FIG. 1A, the backer bar 20 or 20A comprising a backer bar radius 29, the method further comprising the process 350 described in connection with FIG. 3 of, at the first finishing head 100;

(a) in step 352, positioning the backer bar 20 or 20A against the belt inner surface 12 so that the belt outer surface 11 contacts the first finishing media 30 to define a finishing contact arc 35 with respect to the backer bar radius 29;

(b) in step 353, applying a tension 32, a feed rate 33 and a pressure 34 to the first finishing media 30; and (c) in step 354, finishing the seam 13 with the first finishing media 30.

In continued summary, there has been described an intermediate transfer belt 10' depicted in FIG. 4 comprising a seam 13' that has been finished by the process 300 of FIG. 3 in connection with the finishing machine 200 of FIG. 2.

In continued summary, there has been described an intermediate transfer belt 10' depicted in FIG. 4 comprising a seam 13' that has been finished by the process 350 of FIG. 3A in connection with the finishing machine 200A of FIG. 2A.

In continued summary, there has been described an intermediate transfer belt 10' depicted in FIG. 4 comprising a seam 13' that has been finished by the process 350 of FIG. 3A in connection with the finishing machine 200B of FIG. 2B.

In continued summary, there has been described a printing machine 500 depicted in FIG. 5 comprising an intermediate transfer belt 400 (or element 10') depicted in FIG. 4, the intermediate transfer belt comprising a seam 13' that has been finished by the process 300 of FIG. 3 in connection with the finishing machine 200 of FIG. 2.

In continued summary, there has been described a printing machine 500 depicted in FIG. 5 comprising an intermediate transfer belt 400 (or element 10') depicted in FIG. 4, the intermediate transfer belt comprising a seam 13' that has been finished by the process 350 of FIG. 3A in connection with the finishing machine 200A of FIG. 2A.

In continued summary, there has been described a printing machine 500 depicted in FIG. 5 comprising an intermediate transfer belt 400 (or element 10') depicted in FIG. 4, the intermediate transfer belt comprising a seam 13' that has been finished by the process 350 of FIG. 3A in connection with the finishing machine 200B of FIG. 2B.

In one embodiment, the abrasive finishing media depicted herein as any of the finishing media 30, 30A, 30B and 30C comprises 15 micron 3 mill, 16-inch wide Lapping film, available from 3M Abrasive Systems Division as 3M part number 461X. The term "3M" is a trademark of the 3M Corporation, Saint Paul, Minn.

In another embodiment, the abrasive finishing media depicted herein as any of the finishing media 30, 30A, 30B and 30C comprises 15 micron 5 mill, 16-inch wide Microfinishing film, available from 3M Abrasive Systems Division as 3M part number 472L. The term "3M" is a trademark of the 3M Corporation, Saint Paul, Minn.

The foregoing two (2) film types are available from 3M Abrasive Systems Division, phone 800-742-9546.

While various embodiments of a method of finishing a belt seam using an abrasive finishing machine, a method of finishing a belt seam using an abrasive finishing machine having a plurality of finishing heads, and a method of finishing a belt seam using an abrasive finishing machine having first, second, third and fourth finishing heads, in accordance with the present invention, have been described hereinabove, the scope of the invention is defined by the following claims.

What is claimed is:

1. A method of finishing a seam of a belt, the belt comprising a belt outer surface and a belt inner surface, the seam comprising a seam outer surface of a seam width with adhesive disposed thereon, the method comprising providing an abrasive finishing machine including an abrasive finishing media with a finishing surface, the method further comprising providing a backer bar, the backer bar comprising a backer bar surface with a backer surface curvature based on a backer bar radius, the method comprising:

(a) positioning the backer bar surface against the belt inner surface so that the belt outer surface contacts the finishing surface to define a finishing contact arc with respect to the backer bar radius;

(b) applying a tension, a feed rate and a pressure to the finishing media; and (c) using the finishing machine, finishing the seam to remove the adhesive material, including adjusting the backer bar radius so that the finishing contact arc covers the seam width.

2. The method of claim 1, the backer bar radius being adjusted by grinding the backer bar.

3. The method of claim 1, the finishing contact arc overlapping the seam width by no more than 10%.

4. The method of claim 1, the belt comprising an intermediate transfer belt.

5. The method of claim 1, the seam finishing resulting in a finished seam that is imageable.

6. The method of claim 1, the backer bar being cylindrical-shaped.

7. The method of claim 6, the backer bar having a backer bar radius of about 1 and ⅝ inches.

8. A method of finishing a seam of a belt, the belt comprising a belt outer surface and a belt inner surface, the seam comprising a seam width, the method comprising providing a finishing machine having a plurality of finishing heads, wherein a first finishing head of the plurality of finishing heads comprises a first finishing media and a second finishing head of the plurality of finishing heads comprises a second finishing media, the method further comprising providing a backer bar, the backer bar comprising a backer bar radius, the method further comprising, at the first finishing head:

(a) positioning the backer bar against the belt inner surface so that the belt outer surface contacts the first finishing media to define a finishing contact arc with respect to the backer bar radius;

(b) applying a tension, a feed rate and a pressure to the first finishing media; and finishing the seam with the first finishing media, wherein the backer bar radius is adjusted so that the finishing contact arc covers the seam width.

9. The method of claim 8, the backer bar radius being adjusted by grinding the backer bar.

10. The method of claim 8, the finishing contact arc overlapping the seam width by no more than 10%.

11. The method of claim 8 further comprising, at the second finishing head, finishing the seam with the second finishing media.

12. The method of claim 8, the belt comprising an imageable belt.

13. The method of claim 12, the belt comprising an intermediate transfer belt.

14. The method of claim 8, the backer bar being cylindrical-shaped.

15. The method of claim 14, the backer bar having a backer bar radius of about 1 and ⅝ inches.

16. A method of finishing a seam of a belt, the belt comprising a belt outer surface and a belt inner surface, the seam comprising a seam width, the method comprising providing a finishing machine having a first finishing head comprising a first finishing media, a second finishing head comprising a second finishing media, a third finishing head comprising a third finishing media and a fourth finishing head comprising a fourth finishing media, the method further comprising providing a backer bar, the backer bar comprising a backer bar radius, the method further comprising, at the first finishing head;

(a) positioning the backer bar against the belt inner surface so that the belt outer surface contacts the first finishing media to define a finishing contact arc with respect to the backer bar radius;

(b) applying a tension, a feed rate and a pressure to the first finishing media; and (c) finishing the seam with the first finishing media, wherein the backer bar radius is adjusted so that the finishing contact arc covers the seam width.

17. The method of claim 16, the backer bar radius being adjusted by grinding the backer bar.

18. The method of claim 16, the finishing contact arc overlapping the seam width by no more than 10%.

19. The method of claim 16 further comprising, at the second finishing head, finishing the seam with the second finishing media.

20. The method of claim 19 further comprising, at the third finishing head, finishing the seam with the third finishing media.

21. The method of claim 20 further comprising, at the fourth finishing head, finishing the seam with the fourth finishing media.

22. The method of claim 16, the belt comprising an imageable belt.

23. The method of claim 22, the belt comprising an intermediate transfer belt.

24. The method of claim 16, the backer bar being cylindrical-shaped.

25. The method of claim 24, the backer bar having a backer bar radius of about 1 and ⅝ inches.

* * * * *